United States Patent [19]
Jones

[11] 3,909,205
[45] Sept. 30, 1975

[54] LIQUID TRANSFER SYSTEM

[75] Inventor: Robert H. Jones, Fullerton, Calif.

[73] Assignee: Beckman Instruments, Inc., Fullerton, Calif.

[22] Filed: July 16, 1973

[21] Appl. No.: 379,715

[52] U.S. Cl. .................. 23/259; 73/4 R; 73/422 R; 137/209
[51] Int. Cl. .......................... B01l 11/00; G01n 1/00
[58] Field of Search .......... 23/259, 253 R; 137/209, 137/253; 222/57; 73/4 R; 35/19 R, 18 R

[56] References Cited
UNITED STATES PATENTS

| | | | |
|---|---|---|---|
| 2,562,494 | 7/1951 | Hejduk | 73/4 R UX |
| 2,600,324 | 6/1952 | Rappaport | 73/4 R X |
| 2,974,130 | 3/1961 | Moberly | 23/253 R X |
| 3,222,135 | 12/1965 | Ashmead | 23/259 X |
| 3,241,922 | 3/1966 | Walisch | 23/253 R |
| 3,419,358 | 12/1968 | Smythe et al. | 23/253 R X |
| 3,488,154 | 1/1970 | Hronas | 23/253 R X |
| 3,718,438 | 2/1973 | Anscherlik | 23/259 |

FOREIGN PATENTS OR APPLICATIONS

| | | | |
|---|---|---|---|
| 749,525 | 11/1944 | Germany | 73/4 R |

Primary Examiner—Joseph Scovronek
Attorney, Agent, or Firm—R. J. Steinmeyer; P. R. Harder

[57] ABSTRACT

A pneumatic transfer system is provided for supplying liquid from a storage vessel to the reservoir of a doser which dispenses fixed quantities of a liquid and maintaining the level of liquid in the reservoir substantially constant. The doser reservoir is at a higher elevation than the storage vessel. The vessel is closed at the top to form an air bell above the level of storage liquid with two tubes extending downward through the storage liquid from the top of the vessel. One tube forms a liquid supply tube connected to the doser reservoir below the liquid level therein and the other tube is a pressure supply tube, connected to a source of pneumatic pressure with a pressure regulator connected to the pressure supply tube. The pressure regulator comprises a column of liquid open at the top having a tube therein with an upper end connected to the pressure supply tube and the lower end extending downward into the liquid supply, so that the height of the liquid column determines the level of liquid which is restored in the doser reservoir because the pressures in the two tubes are the same.

8 Claims, 4 Drawing Figures

1

LIQUID TRANSFER SYSTEM

BACKGROUND OF THE INVENTION

In automatic devices for filling and dispensing a fixed quantity of liquid a reservoir is required in which there is a continuous supply of liquid, at a level maintained between rather restrictive limits and it is not practical to connect the dosing apparatus directly to a large storage vessel. Dosing apparatus of the type described in U.S. Pat. No. 3,718,438 uses pneumatic pressure to fill and dispense a fixed quantity of liquid.

An object of the invention is to provide a simple reliable pneumatic liquid transfer system which supplies liquid from storage to small containers at the proper elevation relative to dosing apparatus, utilizing equipment normally used with the dosing apparatus and avoiding any need for large, cumbersome, storage containers at an elevated location in order to be in proper relationship to the dosers and without requiring any mechanical apparatus or pumps not otherwise required for doser operation.

Other and further objects, features and advantages of the invention will become apparent as the description proceeds.

SUMMARY OF THE INVENTION

In carrying out the invention in accordance with a preferred form, a storage vessel for the liquid to be delivered to a dosing apparatus reservoir is located anywhere below the elevated location which is usually required for the dosing apparatus. A storage vessel is closed at the top by a two-hole stopper through which two tubes extend to the bottom of the storage vessel so as to extend below the level of liquid in the storage vessel and form a pressure seal for an air bell formed between the top of the storage vessel and the liquid level. One tube extends upward and is connected to the reservoir of the doser below the liquid level therein. The other tube is connected to a pressure supply line which is also connected to a pressure regulator. The pressure regulator is a simple device consisting of a tube extending downward into a liquid level column. The position of the tube is adjustable so that the distance between the top of the liquid in the liquid column and the lower end of the tube in the liquid column has a pressure head corresponding to the desired pressure head represented by the elevation of the level of the liquid in the doser reservoir above the lower end of the supply tube extending into the storage vessel.

A better understanding of the invention will be afforded by the following detailed description considered in conjunction with the accompanying drawings.

DRAWINGS

FIG. 1 of the drawings is a schematic diagram of an embodiment of the invention as utilized in maintaining the level of liquid in the reservoir of a dosing apparatus.

FIG. 2 is a schematic diagram of a modification of the arrangement of FIG. 1 in which a liquid column pressure regulator is provided in which a plurality of liquid columns in tandem are utilized to avoid the necessity for a liquid column as tall as might otherwise be required, FIG. 3 is a diagram of a modification in the arrangement of FIG. 2 for supplying several doser reservoirs at different levels from liquid storage vessels, and FIG. 4 is a diagram of an arrangement for obtaining multilevel transfer with the type of pressure regulator shown in FIG. 1.

Like reference characters are utilized throughout the drawing to designate like parts.

DETAILED DESCRIPTION

Figure 1:
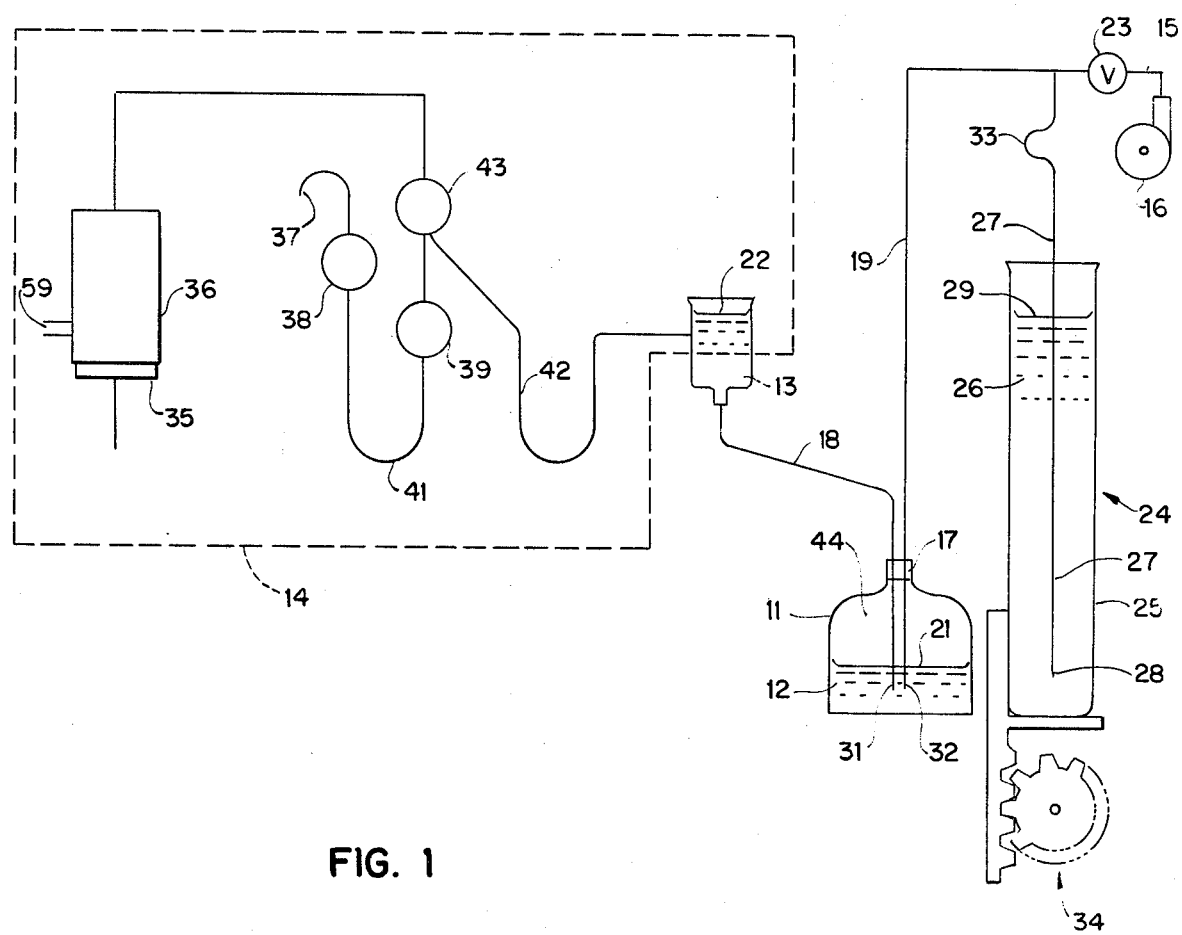

In the embodiment of FIG. 1 a storage vessel 11 is provided for liquid 12 which is to be delivered to an elevated reservoir 13 which may be the liquid reservoir of a dosing apparatus 14. A pneumatic pressure line 15 is provided for effecting the transfer of liquid from the vessel 11 to the reservoir 13. For the sake of illustration the pressure supply line 15 is shown as being connected to a centrifugal air pump 16.

The top of the storage vessel 11 is closed by a two-hole stopper 17 receiving two tubes 18 and 19 extending downward into the vessel 11 to the vicinity of the bottom thereof so as to have lower ends below the storage liquid level 21. The tube 18 constitutes a liquid supply tube and has its upper end connected to the bottom of the liquid reservoir 13 so as to be connected to the reservoir 13 below the level 22 of liquid therein. The tube 19 constitutes an extension of the pressure supply line 15 which may, if desired, have a valve 23 therein which may be closed when the pump 16 is shut down to prevent loss of pressure in the pressure supply line 15. A pressure regulator 24 is connected to the pressure supply line 15 branching from the lines 15 and 19.

In the embodiment of FIG. 1 the pressure regulator 24 constitutes a container 25 holding a column of liquid 26 and a tube 27 connected at the upper end to the pressure supply line 15 and extending downward to a lower end 28. Assuming that the liquid 26 and the liquid 12 have the same specific gravity and that it is desired that the liquid level 22 in the reservoir 13 be the same as the liquid level 29 in the column 26, then the lower end 28 of the tube 27 is adjusted to be at the lower end 31 of the liquid supply tube 18. Normally the lower end 32 of the pressure supply tube 19 will also be at this same level. However, the tube 27 may be connected to the pressure supply line 15 through a bight 33 of flexible tubing to permit upward and downward adjustment of the lower end of the tube 27, or suitable mechanism such as a rack and pinion linkage 34 may be provided to change the elevation of the container 25 for adjusting the elevation of the liquid level 29 of the liquid column 26 without moving the tube 27.

The dosing apparatus 14 may be of the type described in detail in U.S. Pat. No. 3,718,438. In using such apparatus a fixed quantity of liquid is dispensed periodically from a spout 37. There may be a pump having a piston 35 reciprocating in a cylinder 36 to supply pressure or vacuum to a collecting bulb 43 or vent to atmosphere. Such dosing apparatus includes among other parts not shown herein a suction bulb 38 and a dosing bulb 39 with connecting tubing 41, and with tubing 42 from the liquid reservoir 13 to the collecting bulb 43. Other parts essential to proper operation of the doser are described in the aforementioned U.S. Pat. No. 3,718,438.

OPERATION

When air flow from the pump 16 commences, supplying pneumatic pressure through the lines 15 and 19, air pressure regulated by the pressure regulator 24 is conveyed through the tube 19 to the bottom of the storage vessel 11. This causes liquid to rise in the liquid supply line 18. Air bubbles rise from the lower end 32 of the tube 19 into the air bell 44 formed above the liquid level 21 in the storage vessel 11. As air pressure increases in the air bell 44, liquid rises in the liquid supply line 18 and in the reservoir 13 until the liquid head is the equivalent of the air pressure above the liquid in the vessel 11 plus the head of liquid in the vessel 11. When this occurs the system is in equilibrium and there is no further flow of liquid. All air discharging from the pump 16 now flows through the tube 27 to its lower end 28 and discharges from the pressure regulator 24 by bubbling out through the liquid 26. As shown in the drawing, the container 25 is of substantially greater diameter than the tube 27 so that loss of liquid 26 from the container 25 does not occur.

In the arrangement illustrated it is assumed that the specific gravity of the liquid 26 and the liquid 12 are the same and that the lower end 28 of the tube 27 is at the same level as the lower end 31 of the tube 18. Consequently, the pressure heads in the two lines 18 and 19, measured in units of height of the liquid used, are the same, the system thus being in equilibrium. In this case the liquid levels 22 and 29 will be the same. However, it is not necessary that the pressure regulator 24 be at the level shown inasmuch as for liquids of the same specific gravity the difference in level between the lower end 31 of the supply line 18 and the level 22 in the reservoir 13 will correspond to the difference in level between the lower end 28 of the tube 27 and the liquid column level 29. Thus, the entire pressure regulator unit consisting of the container 25 and the tube 27 might be higher or lower without changing the level 22 in the reservoir 13. On the other hand, if it is desired to adjust the level 22 upward or downward, this may be done by holding the tube 27 in fixed position and moving the container 25 up or down by adjustment of the rack and pinion 34, or the container 25 may be maintained in fixed position and the tube 27 may be moved up or down.

The method of operation of a doser such as the doser 14 is described in detail in U.S. Pat. No. 3,718,438. However, the operation may be summarized as follows. It is assumed that the liquid level 22 in the reservoir 13 is at its equilibrium level at the start of the cycle.

The level of liquid in the doser reservoir 13 fluctuates during the cycle of operation of the doser. Not only must sufficient liquid be transferred to the reservoir 13 to make up for that dispensed, but the level in the reservoir must be maintained within certain restricted limits for proper operation of the doser. For the purpose of explaining the operation of the present invention, it will be sufficient to point out that during the doser fill cycle some liquid is sucked from the reservoir 13 by the vacuum created during the suction stroke of the piston 35 (downward stroke in the arrangement illustrated). This causes the liquid transfer system already described to operate to restore the level in the reservoir 13 to an equilibrium position.

During the doser vent cycle with the piston 35 moved further on the suction stroke so as to open a vent 59, liquid flows by gravity from the bulb 43 of the doser back into the reservoir 13.

During the doser discharge cycle, the reverse or pressure stroke of the piston 35, a measured quantity of liquid is expelled from the bulb 38 through the spout 37.

During the complete cycle of operation, the liquid level in the reservoir 13 consequently moves slightly above and below its equilibrium level. The extent of this variation depends largely upon the volume of the collecting bulb 43 of the doser 14 and the diameter of the reservoir 13. With any reasonable diameter of reservoir 13 in relation to the volume of the collecting bulb 43, the level in the reservoir 13 is readily maintained by the transfer system described herein within the level limits required for operation of the doser 14.

The pressure regulator 24 will also be effective if the specific gravity of the liquid dispensed from the vessel 11 is different from that of the liquid 26. In this case the level 22 in the reservoir 13 is maintained by making the ratio of the vertical distance between points 28 and 29 and the vertical distance between points 31 and 22 inversely proportional to the ratio of the specific gravity of the liquid 26 to the specific gravity of the liquid 12.

SECOND EMBODIMENT

Figure 2:
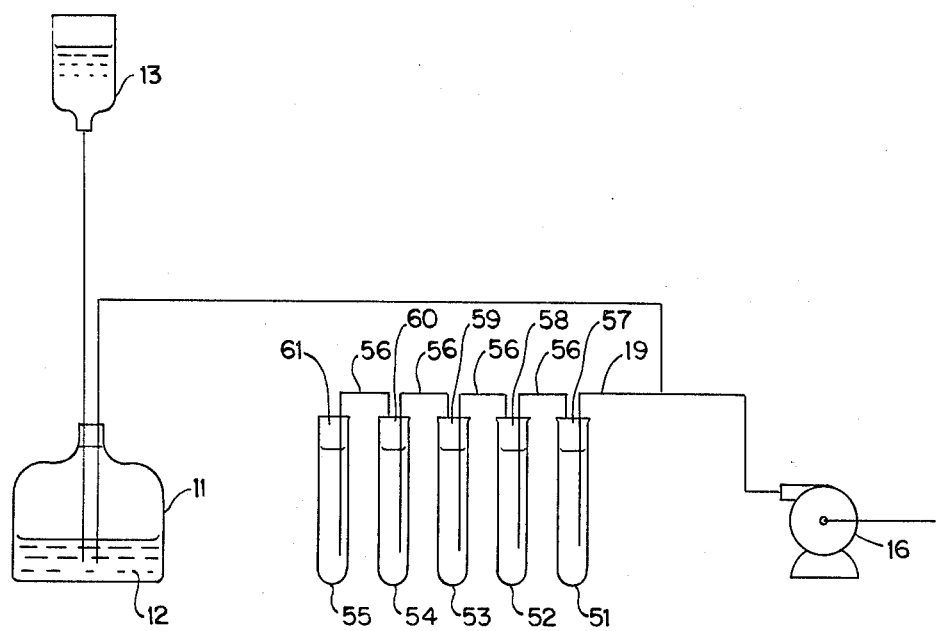

In the case where it is desired to have a relatively great distance between the vertical location of the storage vessel 11 and the elevation of the dosing reservoir 13, this may be accomplished without necessitating a very tall container 25 and liquid column 26. In such circumstances the liquid column 26 and the container 25 therefor are divided into a plurality of containers as shown in FIG. 2. If five containers 51, 52, 53, 54 and 55 are employed, the liquid column in each container need be only one fifth that of the liquid column 26 in FIG. 1. Each of the containers except the final container 55 is a closed container with a closed air space 57, 58, 59, or 60 at the top and the last container 55 is open at the top corresponding to the arrangement of the container 25 of FIG. 1. The tube 19 extends to the bottom of the container 51. The closed top of each container is connected by a tube 56 extending to the bottom end of the next container. Closed air spaces 57–60 are thus formed at the top of each of the closed containers 51, 52, 53 and 54. As air is delivered through the line 19, air finally bubbles from the liquid 61 in the open top container 55. The pressure head in the line 19 is the equivalent of all the liquid heads in all the containers 51, 52, 53, 54 and 55, i.e. the sum of the depths of immersion of the tubes in all the containers. Pressure in the air space in the container 51 is equivalent to the liquid heads in subsequent containers, that is, containers 52, 53, 54 and 55. Pressure in the space in container 52 is equivalent to all the liquid heads in containers 53, 54 and 55. In each case the pressure in an air space in a container is equivalent to all the liquid heads in subsequent containers.

The air pressure in each air space 57–60 thus must correspond to the pressure in the pneumatic pressure line 19 diminished by the liquid head of the tube in the container and the tubes in any preceding containers. Thus, in container 51 the pressure in the air space 57 plus the liquid head in the tubing 19 represents the pressure in the line 19. In the container 52 the pressure in the air space 58 plus the pressure represented by the liquid head in the tube 56 equals the pressure in the air space 57 in the tube 51. Since the pressure in each such air space is less in each tube progressing toward the tube 55, it will be seen that the liquid head of the tube dipping into the container 55 need be only that corresponding to the air pressure in the space 60 at the top of the container 54.

THIRD EMBODIMENT

Figure 3:
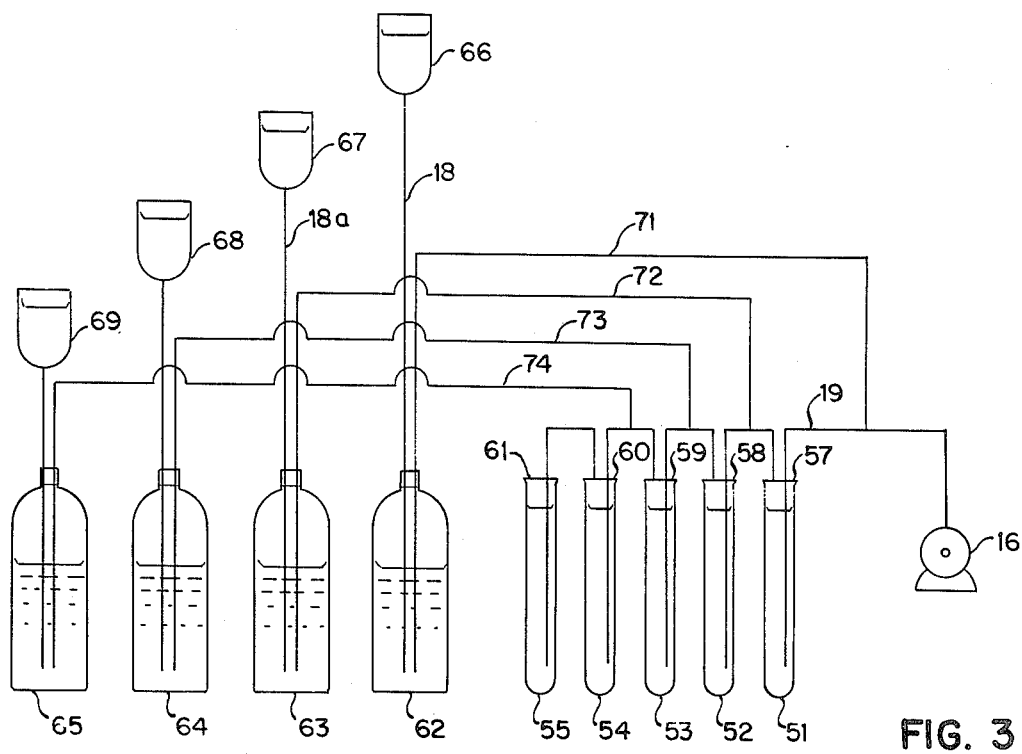

The general arrangements of FIGS. 1 and 2 may be employed also to provide liquids in reservoirs at several different elevations. This arrangement of FIG. 2 is particularly useful in this respect in that the tubing joining successive containers provides successively different pressures or equivalent liquid heads. This is indicated in FIG. 3 which shows an arrangement for transferring liquid from four different storage vessels 62, 63, 64 and 65 to doser reservoirs 66, 67, 68 and 69, respectively, at different levels and maintaining the level in each reservoir within prescribed limits.

A tube 71 connected to the line 19 and dipping into the storage vessel 62 provides the maximum liquid head to the doser reservoir 66 having its liquid supply line tube 18 also dipping into the storage vessel 62. A second tube 72 connected to the space 57 at the top of the container 51 dips into the second storage vessel 63 to cause liquid to be transferred and level to be maintained in a reservoir 67 at a lower level than reservoir 66 through its liquid supply tube 18a dipping into the storage vessel 63. In a similar manner a tube 73 connected to the space 58 above the container 52 and a tube 74 connected to the space 59 above the container 53 cause transfer of liquid and maintenance of liquid level in doser reservoirs 68 and 69 at successively lower levels.

FOURTH EMBODIMENT

Figure 4:
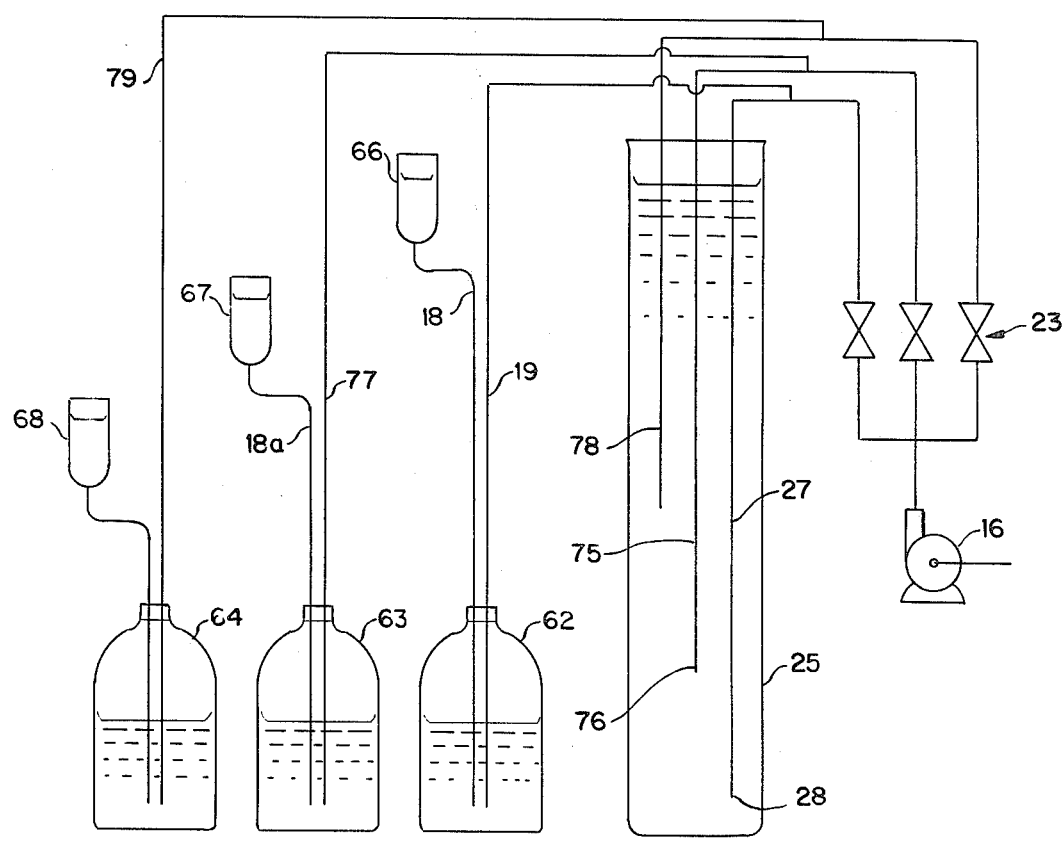

Multi-level transfer may also be obtained from a single liquid column container 25, such as shown in FIG. 1. Such a container and a plurality of liquid column tubes having their lower ends at different levels are utilized as illustrated in FIG. 4. In this case the liquid column tube 27 having its lower end 28 near the bottom of the container 25 provides the pressure regulation at the maximum liquid level head for the uppermost doser reservoir 66. A second liquid column tube 75 having its lower end 76 higher in the container 25 than tube 27 provides for regulation of pressure at a lower equivalent liquid head through a tube 77 dipping toward the bottom of the storage vessel 63 for transferring liquid through a liquid supply line tube 18a to the doser reservoir 67 at a lower level than reservoir 66. In a similar manner a liquid column tube 78 which is still shorter provides for a still lower equivalent liquid head for the transfer of liquid to the still lower doser reservoir 68.

While a particular form of the invention has been illustrated and described, it will be obvious to those skilled in the art that various modifications and alterations may be made therein and it is intended to cover all such modifications and alterations as may fall within the spirit and scope of the invention.

What is claimed is:

1. In apparatus for transferring liquid from a storage vessel containing liquid to a liquid-containing reservoir having means for withdrawing liquid from the reservoir, the reservoir being located above the storage vessel, the apparatus also maintaining the level of said liquid in the reservoir at a substantially constant level as liquid is withdrawn therefrom, the improvement comprising:

means for closing the storage vessel and forming an air bell above the liquid in the storage vessel,
a liquid supply line connected to the reservoir below the level of liquid therein and extending downward into the storage vessel below the level of liquid in the storage vessel,
a pneumatic pressure supply line extending into the storage vessel below the level of liquid contained therein, and
liquid column means for maintaining in the pressure supply line a pressure head measured in units of liquid height which equals the elevation of the liquid in the liquid reservoir above the lower end of the liquid supply line in the storage vessel.

2. In apparatus for transferring liquid from a storage vessel containing liquid to a liquid-containing reservoir having means for withdrawing liquid from the reservoir, the reservoir being located above the storage vessel, the apparatus also maintaining the level of said liquid in the reservoir at a substantially constant level as liquid is withdrawn therefrom, the improvement comprising:

means for closing the storage vessel and forming an air bell above the liquid in the storage vessel,
a liquid supply line connected to the reservoir below the level of liquid therein and extending downwardly through the storage vessel to below the level of liquid in the storage vessel,
a pneumatic pressure supply line extending below the level of liquid in the storage vessel,
a pressure regulator which comprises a container of liquid, open to the atmosphere, and a tube of smaller diameter than the liquid container and having one end connected to the pneumatic pressure line and the other end extending downwardly through the container to a level below the liquid level in the container, and
means for supporting the liquid container and the tube therein movable vertically with respect to each other whereby the depth to which the other end of said tube extends below the level of liquid in the container may be adjusted.

3. The improvement described in claim 2 wherein the elevation of the liquid in the liquid column above the lower end of the tube therein is at the desired elevation of the liquid level in the reservoir above the lower end of the supply line.

4. The improvement described in claim 2 wherein the liquid supply line and the tube in the pressure regulator liquid column extend downward to the same level, and the liquid column has an upper level at the liquid level to be maintained in the reservoir.

5. The improvement described in claim 2 wherein the liquids in the liquid column and in the storage vessel have different specific gravities and the ratio between the height of the liquid level in the liquid column above the lower end of the tube therein to the height of the liquid level in the reservoir above the lower end of the supply line is inversely proportional to the ratio between the specific gravity of the liquid in the liquid column and the specific gravity of the liquid in the storage vessel and the reservoir.

6. The improvement described in claim 2 wherein the pressure regulator comprises liquid column means connected in tandem comprising a plurality of containers and tubes, including at least a first closed container with liquid therein and an open container with liquid therein, each container having a tube extending downward therein through liquid therein, and being of greater diameter than the tube, the tube in the first closed container being connected to the pressure supply line and each succeeding container tube being connected to the upper end of the preceding container, the open top container constituting a final container of the tandem liquid column means.

7. In apparatus for transferring liquid from a plurality of storage vessels containing liquid to a plurality of liquid-containing reservoirs at different levels with respect to the storage vessels from which they are to be supplied, the improvement which comprises:

means for closing each of the storage vessels and forming air bells above the liquid in each storage vessel, a liquid supply line connected to each reservoir below the level of liquid therein and extending downwardly through the closing means of the associated storage vessel to below the level of liquid contained in such associated storage vessel, a pneumatic pressure line for each storage vessel, each pressure line extending to below the level of liquid in the associated storage vessel, and a pressure regulator for maintaining in the respective pneumatic pressure lines a pressure head measured in units of liquid height equal to the elevation of the liquid in the liquid reservoir above the lower end of the liquid supply line within the respective associated storage vessel, said pressure regulator comprising container means, open to the atmosphere, and having a liquid contained therein, a plurality of liquid column tubes in the liquid container means and having one end contained to a respective pneumatic pressure line for one of the reservoirs and a lower end extending a different distance downward through liquid in the container means.

8. In apparatus for transferring liquid from a plurality of storage vessels to a plurality of different liquid containing reservoirs located at different heights above their respective storage vessels, the improvement which comprises:

means for closing each storage vessel and forming an air bell above the liquid in such storage vessel, a liquid supply line connected to each reservoir below the level of liquid therein and extending downwardly through the closing means of the associated storage vessel to below the level of liquid in such associated storage vessel, a different pneumatic pressure line having one end extending through said closing means to a level below the level of liquid in the associated storage vessel, a pressure regulator having liquid column means connected in tandem comprising a plurality of containers and tubes and including at least a first closed container with liquid therein and an open top container with liquid therein, each container having a tube extending downwardly therein to a level below the liquid level of the liquid contained therein, the container being of greater diameter than the tube, the tube in the first closed container being connected to the pressure supply line for one of the storage vessels and each succeeding container tube being connected to the upper end of the preceding container, the open top container constituting a final container of the tandem liquid column means, and liquid pressure lines for successive liquid storage vessels each being connected to the upper end of the successively different container.

* * * * *